United States Patent
Wu

(10) Patent No.: US 8,884,734 B2
(45) Date of Patent: Nov. 11, 2014

(54) VISION PROTECTION METHOD AND SYSTEM THEREOF

(76) Inventor: Roger Li-Chung Wu, West Covina, CA (US)

( * ) Notice: Subject to any disclaimer, the term of this patent is extended or adjusted under 35 U.S.C. 154(b) by 1375 days.

(21) Appl. No.: 12/313,235

(22) Filed: Nov. 17, 2008

(65) Prior Publication Data

US 2010/0123544 A1    May 20, 2010

(51) Int. Cl.
G08B 21/00 (2006.01)
G05B 23/02 (2006.01)
G06Q 10/00 (2012.01)

(52) U.S. Cl.
CPC ..................... *G06Q 10/00* (2013.01)
USPC ........................ 340/3.1; 340/686.6

(58) Field of Classification Search
USPC .................................. 345/326, 211
See application file for complete search history.

(56) References Cited

U.S. PATENT DOCUMENTS

| | | | | | |
|---|---|---|---|---|---|
| 4,716,469 | A | * | 12/1987 | Kim et al. | 348/818 |
| 5,389,952 | A | * | 2/1995 | Kikinis | 345/212 |
| 5,478,241 | A | * | 12/1995 | Hsu | 434/379 |
| 5,592,148 | A | * | 1/1997 | Morales | 340/540 |
| 6,052,119 | A | * | 4/2000 | Chiang | 345/212 |
| 6,075,525 | A | * | 6/2000 | Hsieh | 345/589 |
| 6,364,485 | B1 | * | 4/2002 | Fateh | 351/203 |
| 2004/0121823 | A1 | * | 6/2004 | Noesgaard et al. | 455/575.1 |
| 2004/0239517 | A1 | * | 12/2004 | Coley et al. | 340/686.6 |
| 2005/0052341 | A1 | * | 3/2005 | Henriksson | 345/4 |
| 2006/0259930 | A1 | * | 11/2006 | Rothschild | 725/81 |
| 2008/0100468 | A1 | * | 5/2008 | Xu | 340/691.1 |

* cited by examiner

*Primary Examiner* — Brian Zimmerman
*Assistant Examiner* — Cal Eustaquio
(74) *Attorney, Agent, or Firm* — Raymond Y. Chan; David and Raymond Patent Firm

(57) ABSTRACT

The vision protection method and system thereof is provided to ensure a viewer to rest his/her eyes after viewing on an electronic device for a certain period, wherein the eyesight protection method includes the steps of initially counting down a predetermined working time of a working mode, switching the working mode to a resting mode to temporarily halt the current working mode of the electronic device, and resuming the operation of the working mode that the viewer was previously working on. In that manner, the viewer is enforced to rest his/her eyes after every certain period.

7 Claims, 2 Drawing Sheets

VISION PROTECTION METHOD AND SYSTEM THEREOF

BACKGROUND OF THE PRESENT INVENTION

1. Field of Invention

The present invention relates to a method for limiting the viewing time of a viewer to protect the viewer's eyesight, and more particularly to a method of controlling an electronic device display for ensuring the viewers to rest their eyes after each predetermined period of time.

2. Description of Related Arts

Electronic devices are indispensable for our daily lives. People use computers for work, play video games and watch TVs during their leisure time and etc. Since many people spend a vast portion of their daily lives fixating on display screens of electronic devices, to protect a viewer's eyesight from excessive usage of any electronic device and prevent eye straining become a dramatic issue nowadays.

One of the most important factors in protection of the eyesight for electronic device viewers is to have an intermittent rest for their eyes follow a certain time of use. To protect the eyes from being over-used, the viewer should take a rest and/or do some eye exercises to help relax the muscles of the eyeballs. For example, children spend much time focusing on watching the displays of the electronic devices, such as computers for playing the ever-increasing number of games available. To compensate, the eyeball is thought to grow longer, so less effort is needed to focus up close on the computer display. When this happens, the elongated eye can no longer focus on distant objects. After the muscle of the eyeball being elongated too long, the muscle will loose its flexibility for adjusting the focus on distant objects, so that the eyesight problems such as nearsightedness and eye straining can occurred.

Even though people know how important it is to relax the eyeball muscles timely, people tend to forget taking a break and resting their eyes after viewing the display for a certain time. When people put themselves in work or indulge in a video game, it is hard to interrupt the work or video game to rest their eyes. An enforcing feature is needed to remind the viewers not to overuse their precious eyes. It is crucial that this enforcing feature can interrupt the viewer's current work, such as playing video games on an electronic game device, editing files on computer, or watching TV, so that the viewer won't continue to strain his or her eyes from using these devices.

A working distance between the viewer and the display of the electronic device is another important factor. Keeping certain working distance can also help to prevent the eyesight problems from getting worse quickly as well. A method or system for detecting the working distance has a great need for protecting the eyesight. Moreover, younger kids, especially those with family history of nearsightedness, tend to be more likely to develop these visual problems at an earlier age. It is becoming increasingly difficult for their parents to monitor their usage pattern on these electronic devices. Therefore, a dedicated feature on these electronic devices that can monitor both the viewers' usage and working distance is indeed necessary and crucial if we want to slow down the development of visual problems for all users.

SUMMARY OF THE PRESENT INVENTION

An object of the present invention is to provide a vision protection method and system thereof for protecting electronic device viewers from excessive usage of electronic devices and preventing eye straining.

Another object of the present invention is to provide a vision protection method and system thereof for an electronic device viewer, so that the viewer will be forced to rest his/her eyes after a certain time of usage to protect the eyes from being over-used.

Another object of the present invention is to provide a vision protection method and system thereof for protecting an electronic device viewer by ensuring the viewers to have intermittent rests of their eyes for a certain time following a predetermined period of use for the electronic device display.

Another object of the present invention is to provide a vision protection method and system thereof for electronic device viewer for an electronic device viewer, wherein the electronic device is switched from a present working mode to another temporary resting mode for a certain resting time so as to stop the viewers from viewing the display that they are working on after each predetermined time period. In which, the resting mode remains activated until the predetermined resting time is over, and that after the predetermined resting period is over, the system resumes the operation of the working mode of the electronic device that the viewer was working on previously.

Another object of the present invention is to provide a vision protection method and system thereof for electronic device viewer, wherein the display of the working mode of the electronic device that the viewer is working on is preset to be temporarily blanked out as the screen freezes or is replaced by special graphics of the resting mode.

Another object of the present invention is to provide a vision protection method and system thereof for electronic device viewer, wherein the screen displayed during the resting mode of the system is adapted for protecting the eyesight with a pattern or a photo that is soothing for the eyes.

Another object of the present invention is to provide a vision protection method and system thereof for electronic device viewer, wherein the display of the resting mode of the system can be vision therapy exercises, programs, or games designed to relax the muscles of the eyeball.

Another object of the present invention is to provide a vision protection method and system thereof for electronic device viewer, wherein the display of the resting mode of the system for protecting the eyesight is an instruction for stretching exercise, so that the viewers not only get to rest their eyes but also relax the muscles of the neck, back, arms, and wrists during these enforced break times.

Another object of the present invention is to provide a vision protection method and system thereof for electronic device viewer, wherein the system will save all information that the viewer is working on before the system switches to the resting mode to ensure that no information, files or data are lost when the working mode resumes.

Another object of the present invention is to provide a vision protection method and system thereof for electronic device viewer, which includes a setting function where the user can customize the electronic device to set up the desired working time and resting time, wherein the setting function further has a function for inputting individual information such as age, so that the resting screen of the electronic device can display the simple games or eye exercises that is suitable for each age group.

Another object of the present invention is to provide a vision protection method and system thereof, wherein a distance detector is equipped to determine the appropriate working distance between the viewer and the electronic device display. The distance detector is used in conjunction with the system to ensure that a proper distance is kept between the viewer and the display of the electronic device. And in an event that such distance is violated, a warning message will appear on the screen of the electronic device, and if the message continues to be ignored for a predetermined period of time, the electronic device will automatically switch to the resting mode.

Accordingly, in order to accomplish the above objects, the present invention provides a method for protecting the eyesight of the electronic device viewer, comprising the following steps:

initiating a time counter when a viewer starts operating an electronic device, switching the electronic device from a current working mode to a resting mode after a predetermined working time expires to force the viewer from focusing at the display of the electronic device, and switching the electronic device from the resting mode back to the working mode after a predetermined resting time expires, enabling the viewer to resume his/her previous work, wherein a loop is formed for ensuring the viewer to rest his/her eyes by providing intermittent breaks. The loop is broken only when the electronic device is shut down.

In addition, the system of the present invention is equipped with a distance detector which is a device designed to detect a working distance between the monitor and the viewer, wherein a warning message appears on the screen of the electronic device if the working distance falls below a threshold. If the viewer continues to ignore the warning message for more than a predetermined time, the system will "freeze" the electronic device immediately for another predetermined period of time before it can resume operation.

These and other objectives, features, and advantages of the present invention will become apparent from the following detailed description, the accompanying drawings, and the appended claims.

DETAILED DESCRIPTION OF THE PREFERRED EMBODIMENT

Figure 1:
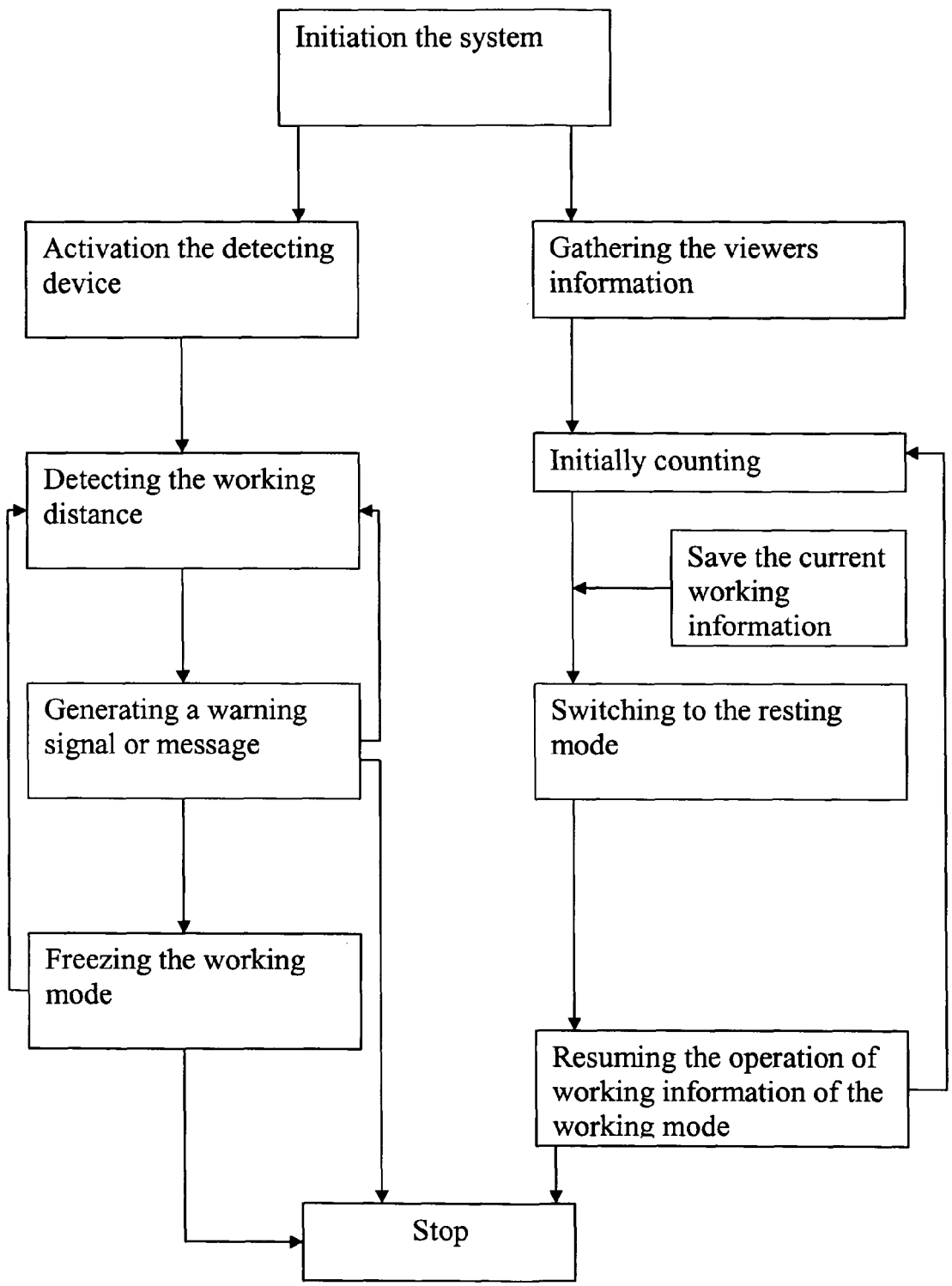
FIG. 1 is a flow chart of a method for protecting the eyesight of an electronic device viewer according to a preferred embodiment of the present invention.

Referring to FIG. 1 of the drawing, a flow chart of a method for eyesight protection of an electronic device viewer is illustrated, wherein the method includes a system comprising the following steps:

(a) initially counting down a predetermined working time in a working mode of the electronic device;

(b) switching the working mode of the electronic device to a resting mode after the predetermined working time expires for a predetermined resting time;

(c) resuming the operation of the electronic device from the resting mode back to the working mode after the predetermined resting time has elapsed; and (d) repeating the above step (a) to (c) to form a loop continuously until the viewer shuts down or halts operating the electronic device so as to ensure the viewer opportunities to rest his or her eyes after a certain period of usage.

The predetermined working time is a period of use time allowed on the electronic devices, for example, including but not limited to watching television, editing files on computer, playing video games or the likes, and the predetermined resting time is a period of time allotted for the resting mode. For example, the predetermined period of working and resting time are pre-set in the electronic device to one hour and ten minute respectively, so that after one hour of working on the electronic device, the electronic device will automatically switch from the working mode to the resting mode for ten minute.

In other words, the current work, such as editing files, playing games, watching television, with the electronic device will be idled by the resting mode to ensure the viewers to rest their eyes during the ten minutes resting time. The working mode of the electronic device will resume after the ten-minute resting mode expires. The system will then restart another one-hour countdown (the predetermined working time), and the viewer will take another ten-minute rest after that one-hour countdown expires.

The electronic device can be a computer, a cellular phone, a PDA, a notebook computer, a hand-held gaming device, a television, a TV gaming device, and etc. When the electronic device is a programmable device such as a computer, the vision protection method of the present invention can be embodied as software, which can be purchased at a retail store or downloaded from the internet, being programmed in the electronic device to execute the above and following steps according to the present invention. The user/viewer can install it onto the electronic device with a few simple steps. The viewers can also register their names on the official website thereof and activate it by choosing the remote monitoring function on its website page without downloading or installing it to the electronic device if the viewers routinely use a public electronic device as long as that particular device has the Internet connection.

A good example of this will be computers at a public library. If a person routinely goes to a library and uses the computers there on a regular basis, he or she can still protect his/her eyesight by using this unique feature of the present invention, as long as that particular computer has an Internet connection, and the viewer does not close the window that has the eyesight/vision protection web page on. The eyesight/vision protection steps can cease running if the computer is turned off, the window with the web page is closed rather than minimized, or simply by clicking on a button on its website or pressing two or more designated keys simultaneously on the keyboard.

According to the preferred embodiment of the present invention, the resting mode is provided to temporarily freeze the current working mode for the period of resting time pre-set and ranged between 5 to 15 minutes after the predetermined working time. After the predetermined resting time is over, the electronic device resumes from the resting mode back to the working mode so the viewers can continue doing their previous work. Accordingly, the viewers of the electronic device are ensured to have intermittent rests of their eyes for a certain time following a predetermined period of time of use of the electronic device.

During the predetermined resting time of the resting mode, the electronic device is preset or programmed to temporarily freeze the current working mode, for example temporarily blanking out the screen display of the electronic device, so as to stop the viewers from viewing the display of the electronic device that they are working on after each predetermined working time.

According to the preferred embodiment of the present invention, during the resting mode, the screen display of the electronic device may also replace the working screen with a special graphic pattern or a photo that is soothing for the eyes during the predetermined resting time for protecting the eyesight of the viewer. Alternatively, during the predetermined resting time of the rest mode, the electronic device may play relaxing music, display soothing photos, or run special programs such as some simple visual therapy games for relaxing the muscles of the eyeball.

The resting mode can also "freeze" the current work on the electronic device by "freeze-framing" on the current work, displaying a plurality soothing pictures that are relaxing for the eyes, some simple games for eye movement exercises, or an instruction for stretching exercises, so as to force the viewers to rest their eyes. In other words, the resting mode is designed to interrupt the current work of the viewer while the viewer is using the electronic device for the predetermined working time. The resting mode serves as a forceful reminder for the viewers to rest their eyes and even provides some entertaining activities or visually enhancing exercises for the viewers while they wait for the "resting time" to expire when using the electronic device.

Before switching from the working mode to the resting mode, the electronic device is programmed to automatically save the current files, data, or working information accumulated by the viewer during the working mode, so that after the resting time is expired, the electronic device resumes normal operation and the viewers can continue from where they were left off right before the resting mode was activated. With this critical feature intact, the viewers can continue their previous work after taking a short break.

The present invention further includes a step of gathering the personal information of the user (viewer) to further customize this method and system of the present invention, where during the initial set-up, the viewers or the parents of the minor viewers can enter the viewer's names, age, and select their preference, usage settings such as the desired working time and the desired resting time according to the viewer's need. It also stores multiple sets of personal information so that it can accommodate multiple viewers for the same electronic device. The viewer can also select from a list of display options during the resting mode, such as a "freeze frame" display, pictures, games, instruction for visual relaxation or instruction for stretching exercise. The age information entered during the initial set-up will be used so that during the resting mode, the method and system of the present invention will choose the appropriate games or instructions suitable for that age group.

The vision protection method of the present invention further comprises a bypassing feature with a preset password that can be entered by people such as parents for emergency reasons. For example, if it is getting really late, and the viewer's work absolutely has to be done, the resting mode can be deactivated immediately by entering the password.

Figure 2:
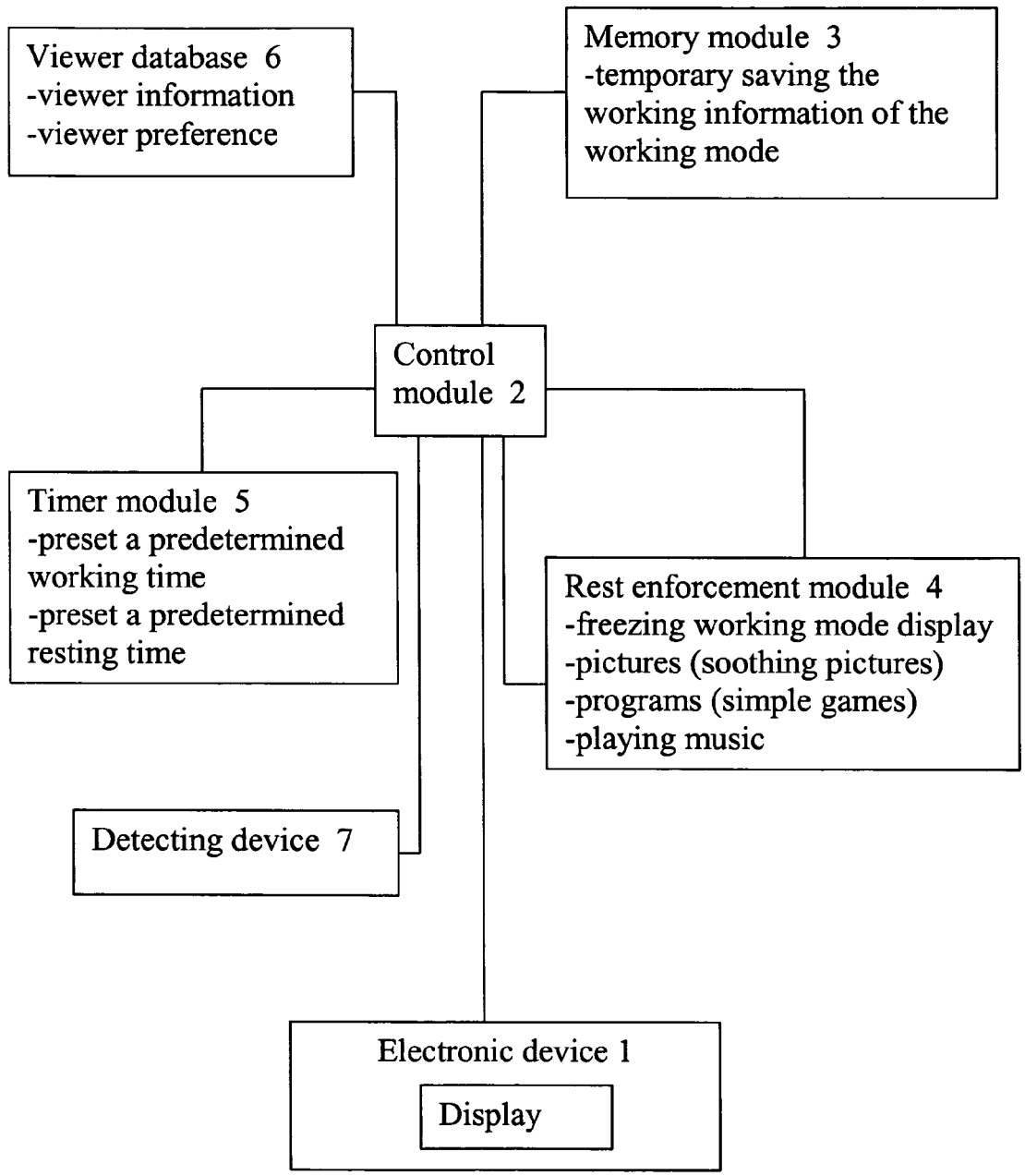
FIG. 2 is a block diagram of a vision protection system according to the preferred embodiment of the present invention.

The vision protection method of the present invention can be embodied to be performed by a system equipped with the electronic device 1 as shown in FIG. 2 of the drawings. The vision protection system for the viewer of the electronic device 1 comprises a control module 2 for coordinating the devices or modules, a memory module 3 for saving the working information, data, or files that the viewer is currently working on, a rest mode enforcement module 4 where a plurality of resting mode activities are stored, a timer module 5 that does the countdown for both the predetermined working time and resting time, and a viewer database 6 for saving the information and preference of the viewer.

According to the preferred embodiment of the present invention, the predetermined working time that ranges from 45 minutes to 1 hour and the predetermined resting time that ranges from 5 to 15 minutes are saved in the timer module 5. As soon as the viewer turns on the electronic device, the timer module 5 starts counting down the predetermined working time. And when the countdown reaches zero, the timer module 5 then sends out a signal, through the control module 2, to the memory module 3, so that the memory module 3 saves all the working information, data, or files that the viewer is working on, before the system temporarily freezes the working mode and switches over to the resting mode in the rest enforcement module 4.

Once the resting mode is activated, the timer module 5 starts another new countdown for the predetermined resting time. After the predetermined resting time is over, the system then switches the electronic device from the resting mode back to the working mode and resumes all operations prior to the mandatory rest. The viewer is instructed to rest their eyes for 5 to 15 minutes after approximately every one hour of using the electronic device. The timer module 5 will repeat the countdown after switching back to the working mode, and ultimately, a loop is formed and intermittent break times are enforced.

The rest enforcement module 4 further comprises a plurality of types of display options for the resting mode, wherein these options are used to either "freeze" the current work display, or "replace" it with a totally different program designed for visual relaxation. The resting mode display can have any of the following options: a "freezing-mode" that temporarily freezes the current display of the working mode; a picture that is soothing for the eyes; a simple game designed for visual relaxation or ocular movements; an instruction for ocular exercises or an instruction for stretching exercises, and etc. . . .

The viewer database 6 comprises the storage of both the viewer information and the viewer preferences, wherein the database has a setting function with an input interface provided for the viewers to key in their personal information such as name, age, and select their preferences of desired working time, resting time, and activities performed during the resting mode. This customization substantially helps the system in choosing the appropriate games or pictures for the age group during the resting mode of the resting enforcement module 4. In other words, the viewer database 6 of the system is provided so that program can accommodate multiple users (viewers) for that particular electronic device 1. When the electronic device 1 is turned on, the vision protection system of the present invention is programmed to ask the viewer to select his/her name from the list of viewers already saved, so that system can upload that user's setting accordingly before the normal operation of the electronic device can begin.

It is worth mentioning that the timer module 5 automatically starts counting down the predetermined working time when the electronic device is turned on. The viewer can install the vision protection system to the electronic device 1, so that when the viewer turns on the electronic device 1, the timer module 5 automatically starts counting down the predetermined working time so as to activate the vision protecting system.

The vision protection system further comprises a detecting device 7, provided to measure the working distance between the viewer and the display of the electronic device 1, wherein when the electronic device 1 is turned on, the control module 2 activates the detecting device 7 simultaneously to determine the proper working distance. The detecting device 7 can be embodied to use a sensor such as infrared, radio wave, or radar to detect the working distance. The detecting device 7 may be built in or mounted on the display of the electronic device 1 and faces toward the viewer, so that if the distance measured by the detecting device 7 between the viewer and the display of the electronic device 1 falls below a predetermined range, the system will generate a warning message or signal on the screen to instruct the viewer to move back to maintain the proper working distance between the display and the viewer. Moreover, if the viewer continues to ignore this message for more than a predetermined warning time, the system will temporarily freeze the electronic device 1, and immediately switch to the resting mode before it can resume operation.

In other words, after activation of the system of the present invention, the step of gathering viewer information and the step of detecting the working distance start simultaneously. Take a 17" display of a computer screen for example, after activating the working-distance detector 7, it will monitor the actual working distance continuously to make sure that the proper distance is kept at all times. When the working distance falls below for example 45 cm, the system will generate a warning message on the display to advice the viewer to move back. If the viewer continues to ignore that message for more than 10 seconds, for example, the system will temporarily freeze the electronic device immediately for 5 minutes before it can resume operation.

The vision protection system can further be enhanced with the service and support of an eye doctor, wherein the doctor will be assigned a personal ID number, so that if the program/system is purchased directly from the viewer's eye doctor, he or she can enter that ID number during the initial set-up. In that way, a manager of the system can track and pay out the commission to the doctor accordingly, and approximately 30 days before the system expires, a reminding message will appear on the display of the electronic device every time it's turned on, not only to tell the viewer that it's time to renew the system, but also it's time to get his/her eyes examined, with the doctor's contacting information attached next to it.

As mentioned above, the vision protection system can be bypassed with a preset password that can be entered by people such as parents for emergency reasons. For example, if a child needs to finish his/her homework and it is getting really late at night, the parent can simply choose to bypass the system by entering the password. Another example will be two people taking turns using the electronic device. The viewers can bypass the resting mode with the password, so that they can skip the unnecessary resting time.

It is also important to mention that the eyesight/vision protection system will have a default setting for rest enforcement module 4, timer module 5, and detecting device 7. These default settings are designed as the safety net in cases where viewers fail to set up the program/system properly or if they are uncertain about the ideal working time, resting time, or working distance for them.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A vision protection method for eyesight protection of a viewer of an electronic device, comprising the steps of:
(a) assigning a personal ID to the viewer by a doctor of the viewer;
(b) inputting the personal ID to the electronic device while activating a vision protection software installed in the electronic device;
(c) after the vision protection software being installed for a predetermined period of time, generating a reminding message on the screen display to remind the view to visit the doctor to have an eye examination;
(d) counting down a predetermined working time in a working mode of the electronic device through the vision protection software, during which the viewer is working on a current work displaying by the electronic device;
(e) switching the working mode of the electronic device to a resting mode by the vision protection software after the predetermined working time expires for a predetermined resting time for protecting the viewer from excessive usage of the electronic device by halting a screen display of the current work so as to ensure the viewer to rest eyes thereof for the predetermined resting time;
(f) switching the electronic device from the resting mode back to the working mode by the vision protection software to resume the display of the current work of the electronic device after the predetermined resting time has elapsed;
(g) detecting a working distance between the viewer and the screen display of the electronic device by connecting a detecting device to the electronic device to face toward the viewer, wherein when the electronic device is turned on, the detecting device is activated simultaneously to determine a proper working distance;
(h) generating a warning message on the screen display to instruct the viewer to move away from the screen display to maintain at least the proper distance between the screen display and the view when the working distance is detected falling below a predetermined range; and
(i) freezing the electronic device and immediately switching to the resting mode when the viewer continues to ignore the warning message for more than a predetermined warning time.

2. A vision protection method for eyesight protection of a viewer of an electronic device, comprising the steps of:
(a) assigning a personal ID to the viewer by a doctor of the viewer;
(b) inputting the personal ID to the electronic device while activating a vision protection software installed in the electronic device;
(c) after the vision protection software being installed for a predetermined period of time, generating a reminding message on the screen display to remind the view to visit the doctor to have an eye examination;
(d) counting down a predetermined working time in a working mode of the electronic device through the vision protection software, during which the viewer is working on a current work displaying by the electronic device;
(e) switching the working mode of the electronic device to a resting mode by the vision protection software after the predetermined working time expires for a predetermined resting time for protecting the viewer from excessive usage of the electronic device by halting a screen display of the current work so as to ensure the viewer to rest eyes thereof for the predetermined resting time; and selectively activating one or more resting mode activities to substitute a screen display of the current work for protecting the viewer from excessive usage of the electronic device; wherein, during the resting mode, the resting mode activities selected from a group consisting of: (i)

idling the electronic device for the predetermined resting time, (ii) temporarily freezing the current work of the electronic device, (iii) temporarily blanking out the screen display of the electronic device for the predetermined resting time so as to stop the viewer from viewing the display of the electronic device, (iv) replacing the screen display of the current work of the electronic device with a graphic display that is soothing for the eyes of the viewer for the predetermined resting time, (v) playing relaxing audio sounds, and (vi) running a program selected from a group consisting of a visual therapy game for relaxing muscles of the eyes of the viewer, a game for eye movement exercises, and an instruction for stretching exercises;

(f) automatically saving current working information and data of the working mode and, in the step (e), after the predetermined resting time is expired, the electronic device resumes all the current working information and data and the viewer is able to continue from where the viewer was left off right before the resting mode was activated;

(g) switching the electronic device from the resting mode back to the working mode by the vision protection software to resume the display of the current work of the electronic device after the predetermined resting time has elapsed;

(h) repeating the steps (d) to (g) to form a loop continuously until the viewer terminates operating the electronic device so as to ensure the viewer opportunities to have intermittent rests of eyes thereof after each of the predetermined working time;

(i) detecting a working distance between the viewer and the screen display of the electronic device by connecting a detecting device to the electronic device to face toward the viewer, wherein when the electronic device is turned on, the detecting device is activated simultaneously to determine a proper working distance;

(j) generating a warning message on the screen display to instruct the viewer to move away from the screen display to maintain at least the proper distance between the screen display and the view when the working distance is detected falling below a predetermined range; and (k) freezing the electronic device and immediately switching to the resting mode when the viewer continues to ignore the warning message for more than a predetermined warning time.

3. A vision protection system for eyesight protection of a viewer of an electronic device, comprising:

a vision protection software which is installed in the electronic device comprising:

a control module for coordinating and communicating the vision protection system with the electronic device;

a rest mode enforcement module having one or more resting mode activities for switching a working mode of the electronic device during which the viewer is working on a current work displaying by a screen display of the electronic device to a resting mode during which one or more resting mode activities substitutes the current work for protecting the viewer from excessive usage of the electronic device by temporarily halting the current working mode displayed in the screen display of the electronic device so as to ensure the viewer to rest eyes thereof, wherein the working mode is a state of the displayed work in which the electronic device is enabled to allow the viewer to view on the electronic device; and a timer module, after the system is activated, counting down a predetermined working time in the working mode and a predetermined resting time of the resting mode of the electronic device, wherein when the timer module counts down until the predetermined working time expires, the working mode of the electronic device is switched to the resting mode of the rest enforcement module through the control module, and that when the timer module counts down until the predetermined resting time expires, the electronic device is switched back from the resting mode to the working mode to resume the current work of the electronic device so that a loop is formed until the viewer deactivates the system so as to ensure the viewer opportunities to have intermittent rests of the eyes thereof after each of the predetermined working times; and a detecting device connected to the electronic device to face toward the viewer for measuring a working distance between the viewer and the screen display of the electronic device, wherein when the electronic device is turned on, the control module activates the detecting device simultaneously to determine a proper working distance, wherein when the working distance is detected by the detecting device falling below a predetermined range, a warning message is generated on the screen display to instruct the view to move away from the screen display to maintain the proper working distance between the screen display and the viewer, wherein when the viewer continues to ignore the warning message for more than a predetermined warning time, the electronic device is freezed and immediately switched to the resting mode, wherein a personal ID is assigned by a doctor of the viewer to the viewer, which is inputted into the electronic device while the viewer activates the vision protection software, wherein after the vision protection software being installed for a predetermined period of time, a reminding message is generated on the screen display to remind the view to visit the doctor to have an eye examination.

4. The system, as recited in claim 3, wherein during the resting mode, the resting mode activities selected from a group consisting of: (i) idling the electronic device for the predetermined resting time, (ii) temporarily freezing the current work of the electronic device, (iii) temporarily blanking out the screen display of the electronic device for the predetermined resting time so as to stop the viewer from viewing the display of the electronic device, (iv) replacing the screen display of the current work of the electronic device with a graphic display that is soothing for the eyes of the viewer for the predetermined resting time, (v) playing relaxing audio sounds, and (vi) running a program selected from a group consisting of a visual therapy game for relaxing muscles of the eyes of the viewer, a game for eye movement exercises, and an instruction for stretching exercises.

5. The system, as recited in claim 4, further comprising a viewer database saving information and preferences of the viewer.

6. The system, as recited in claim 5, further comprising a memory module saving current working information and data of the working mode and that after the predetermined resting time is expired, the electronic device resumes all the current working information and data and the viewer is able to continue from where the viewer was left off right before the resting mode was activated.

7. The system, as recited claim 6, wherein the resting mode is able to be bypassed by entering a preset password.

* * * * *